G. W. FOX, H. H. COE, AND I. M. KELLEY, OF RAVENNA, OHIO.

Letters Patent No. 88,561, dated April 6, 1869.

IMPROVED COMPOUND FOR WELDING AND RESTORING STEEL.

The Schedule referred to in these Letters Patent and making part of the same.

*To all whom it may concern:*

Be it known that we, G. W. Fox, H. H. Coe, and I. M. Kelley, of the city of Ravenna, in the county of Portage, and State of Ohio, have invented a certain new and useful Compound for Welding and Restoring Steel; and we do hereby declare that the following is a full and complete description thereof.

This invention relates to the preparation of a compound to be used by workers in steel, for welding steel, or for restoring burned steel to its former qualities. It is very simple and cheap in materials, and is more efficient in its properties, for the use for which it is designed, than any other article that has ever been used.

The following is a list of ingredients used, and the proportions in which they are compounded, viz, fine sand, sulphate of iron, black oxide of manganese, common salt, rosin, marble-dust, saltpetre, and lamp-black.

To fifteen pounds fine dry sand, add one pound sulphate of iron, one pound black oxide of manganese, one pound common salt, one ounce marble-dust, one ounce saltpetre, one-quarter pound of rosin, and two ounces lamp-black. Let these be well pulverized and well mixed, when it is ready for use.

This compound may be employed in welding steel, or for restoring steel tools to their original purity, in case they should be burned in heating, by applying this compound, and by hammering, when they will be found to be very readily and perfectly restored.

This compound, being so simple, easily obtained, and prepared, will supersede any other preparation now used.

Having thus described our invention,

What we desire to secure by Letters Patent, is—

The compound, consisting of the ingredients herein named, and prepared in about the proportions stated, for welding or restoring steel, in the manner and for the purpose set forth.

G. W. FOX.
H. H. COE.
I. M. KELLEY.

Witnesses:
  WILLIAM COOLMAN,
  GEO. W. TIBBITTS.